United States Patent [19]

Sublette

[11] Patent Number: 4,527,016

[45] Date of Patent: Jul. 2, 1985

[54] CURRENT REGULATED PULSE DIALER WITH MEMORY RETENTION CIRCUIT

[75] Inventor: John D. Sublette, Huntsville, Ala.

[73] Assignee: GTE Business Communication Systems Inc., Northlake, Ill.

[21] Appl. No.: 526,258

[22] Filed: Aug. 25, 1983

[51] Int. Cl.³ .................. H04M 1/274; H04M 1/31
[52] U.S. Cl. ........................... 179/90 B; 179/90 K; 179/77
[58] Field of Search ........... 179/90 B, 90 BB, 90 BD, 179/90 K, 90 R, 16 AA, 16 F, 77, 70

[56] References Cited

U.S. PATENT DOCUMENTS

| | | | |
|---|---|---|---|
| 4,008,380 | 2/1977 | La Borde | 179/90 B |
| 4,167,655 | 9/1979 | Hestad et al. | 179/90 K |
| 4,232,200 | 11/1980 | Hestad et al. | 179/90 K |
| 4,324,954 | 4/1982 | Taylor | 179/90 B |

Primary Examiner—Gene Z. Rubinson
Assistant Examiner—Elio DiVito
Attorney, Agent, or Firm—Robert J. Black; Gregory G. Hendricks

[57] ABSTRACT

A current regulated pulse dialer circuit including a memory for storing predetermined sequences of telephone numbers, for use in a loop powered pulse dialing telephone. A first current source is connected to an electronic pulse dialer to provide a high impedance across the telephone line during transmission and interpulse pause conditions and a second current source is connected to an electronic pulse dialer to maintain the integrity of information stored in the memory portion of the dialer circuitry.

8 Claims, 1 Drawing Figure

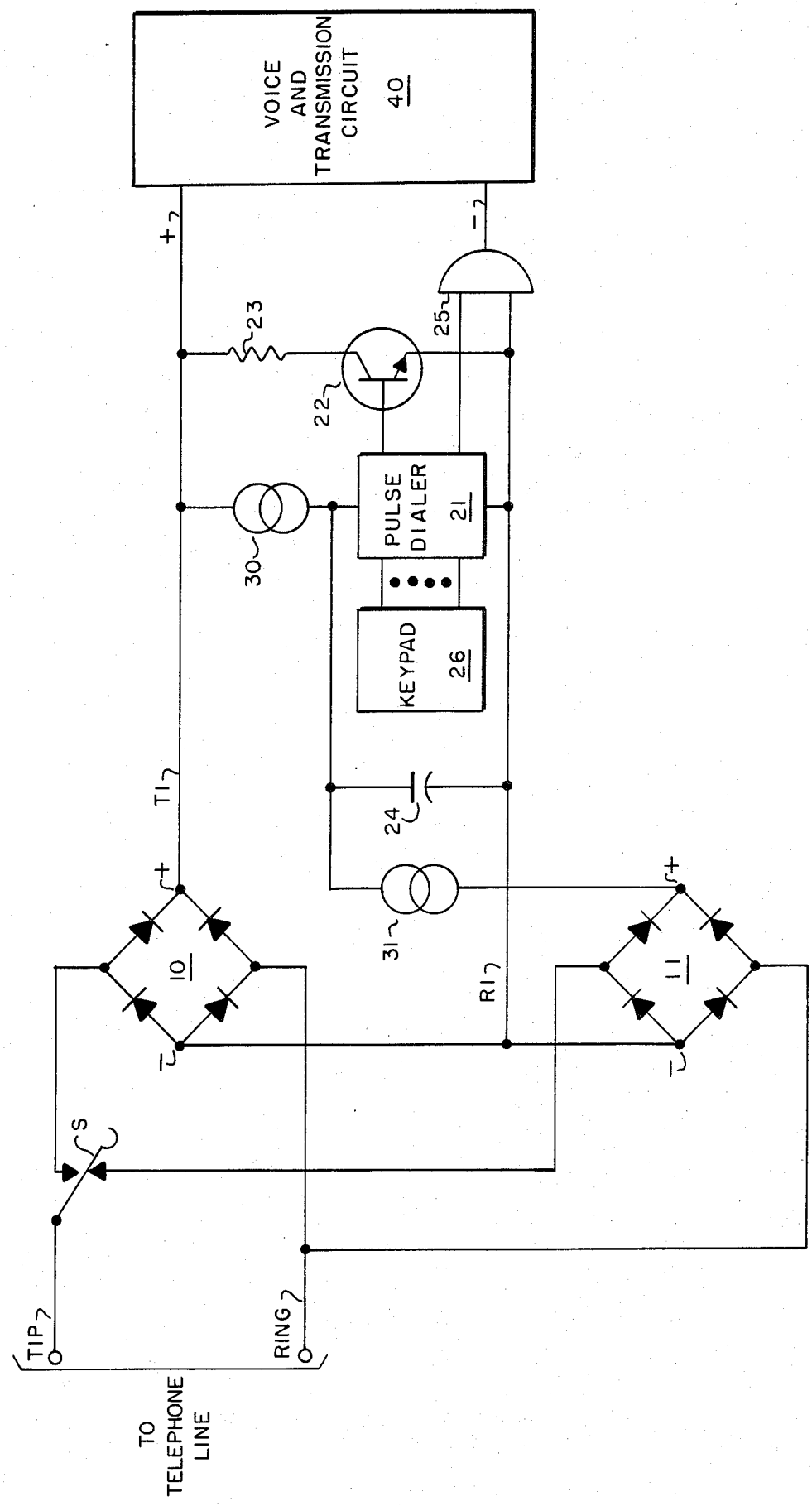

CURRENT REGULATED PULSE DIALER WITH MEMORY RETENTION CIRCUIT

BACKGROUND OF THE INVENTION (1) Technical Field

The present invention relates to electronic pulse dialers as utilized in connection with telephones and more particularly to pulse dialers employing current regulators.

(2) Background Art

Pulse dialers have been used in telephones to provide pushbutton operation while retaining conventional dial pulse signalling. To provide this feature, a pulse dialer is typically connected across the telephone loop and operates to provide pulse signals by breaking and closing the loop. However, since the pulse dialer is connected across the loop it typically presents a low impedance during transmission or open circuit pulsing conditions. Since a true open loop condition does not exist during the break period of out pulsing, dial pulse distortion (low amplitude pulses) frequently results causing a reduction in the usable loop length of the telephone line. Similarly, the pulse dialer presents a low impedance across the loop during transmission conditions, thus shunting these signals and causing a resulting degradation of transmission characteristics. These problems are typically inherent in electronic pulse dialers and have been overcome through the use of relays to break the loop and provide true open circuit conditions.

A technique for overcoming the above objections is provided in my U.S. Pat. No. 4,286,120 issued on Aug. 25, 1981, wherein a high impedance is presented across the telephone line during transmission and interpulse pause conditions by the incorporation of a current source to supply current to the pulse dialer during the "OFF HOOK" condition.

Integrated dialing circuits (both dual tone multi frequency and pulse) have been used in the design of telephones recently. Some of the circuits available as integrated units, have the ability to store one or more telephone numbers which may then be automatically dialed upon command usually by operating a command pushbutton followed by a single digit pushbutton. In order to maintain the information relating to the stored telephone numbers, in memory, voltage must be maintained on the integrated circuit continuously. To this end, several methods have been employed. Among these are the use of an external battery and voltage obtained from the telephone loop itself. The use of external batteries carries with it the disadvantage of being expensive and requiring periodic replacement. Alternatively, powering the integrated circuit from the telephone loop has the disadvantage that the amount of current drawn by the integrated circuit for memory retention during the time the telephone is "ON HOOK" must be very small (usually less than 5 microamps). The most common technique employed previously to limit current in the "ON HOOK" condition has been to connect the integrated circuit to the loop via a large value resistor (5 to 10 megohms typically). The resistor method however has the disadvantage that the current and voltage supplied to the integrated circuit is not constant under all loop conditions presented to the telephone. For example, long telephone loops, low central office batteries and telephones in parallel on the same loop, act to reduce the voltage and current available to retain the stored information in memory. Such conditions typically result in failure of existing telephone circuitry to retain the desired information in memory.

Accordingly, it is the object of the present invention to provide a novel low cost and highly reliable means of providing open circuit conditions to a telephone during transmission and interpulse pause conditions and to provide regulated current to an included integrated circuit dialer (which includes a memory with the ability to store one or more telephone numbers), with a regulated source of current during the "ON HOOK" condition.

SUMMARY OF THE INVENTION

The pulse dialer circuit of the present invention includes a first bridge circuit connected across the Tip and Ring leads of the telephone loop, when the telephone is in the "OFF HOOK" condition. A first current regulator is connected to the pulse dialer, both being connected effectively across the telephone line via the first bridge circuit. The pulse dialer also includes output connections to a pulsing transistor connected across the telephone line. The Tip lead of the telephone line is connected to a voice and transmission circuit while the Ring lead is connected to the voice and transmission circuit via a gate circuit which also includes a connection to an output from the pulse dialer.

A capacitor connected between the negative output of the first bridge and the pulse dialer provides filtering for potential coupled through first current regulator.

A second bridge circuit connected across the Tip and Ring leads of the telephone loop during the "ON HOOK" condition provides power through a second current regulator whose output is also connected to the pulse dialer. Filtering for potential derived through this source is also provided by the same filter capacitor.

By use of the second current source, current and voltage supplied to integrated dialer circuitry is constant over a wide range of different loop conditions. The current through the device is constant for a voltage drop across the device from less than 1 volt to 240 volts. These conditions result in a very high impedance being presented to the loop of the central office. This is necessary since central office circuits are typically designed to accept essentially an open circuit for the "ON HOOK" conditions. Any circuit which presents anything less than megohm magnitude impedance to the central office in the "ON HOOK" condition is in jeopardy of "fooling" the central office into thinking the phone is "OFF HOOK". Such low impedance circuits also cause manner of alarms to result from the automatic test equipment at a telephone central office which looks for undesirable conditions such as the presence of "high leakage" on the telephone line.

Because of its ability to provide consistent current over a wide range of voltages, under the conditions described above, the performance of the memory retention capabilities of the circuit in the presence of the previously described adverse conditions, is substantially improved, as well as eliminating the need for external batteries, the disadvantages of which have already been noted. Although the circuit shown is that of a pulse dialing circuit, the concept is equally applicable to DTMF (Dual Tone MultiFrequency) dialing circuits.

DESCRIPTION OF THE DRAWING

The single FIGURE of the accompanying drawing is a circuit diagram of a current regulated pulse dialer circuit in accordance with the present invention.

DESCRIPTION OF THE PREFERRED EMBODIMENT

Referring now to the accompanying drawing, the current regulated pulse dialer of the present invention is shown connected to a telephone line via Tip and Ring leads. The pulse dialer circuit includes a conventional hookswitch S shown in the "ON HOOK" condition, a first bridge circuit 10 used as a polarity guard connected across the Tip and Ring leads in the "OFF HOOK" condition with the plus output terminal connected to lead T1 and the minus terminal connected to lead R1. The series combination of pulsing transistor 22 and resistor 23 is connected across the T1 and R1 leads as is the series combination of first current regulator 30 and pulse dialer integrated circuit 21. Connected to the pulse dialer 21 is a key pad 26. Capacitor 24 connected across the pulse dialer 21 provides the necessary filtering for both of the current sources. Lead R1 is further connected to voice and transmission circuit 40 via gate circuit 25 which also includes an input circuit connection from the pulse dialer 21. Lead T1 is connected from the positive output of bridge circuit 10 to voice and transmission circuit 40. In the "ON HOOK" condition a second bridge circuit or polarity guard 11 is connected across the Tip and Ring leads and includes its negative output terminal connected to lead R1 and its positive terminal connected to pulse dialer integrated circuit 21 through second current source 31. A number of well known pulse dialer integrated circuits are known, typical of which is that manufactured by National Semiconductor Corporation as their pushbutton pulse dialer MM 53190.

The pulse dialer circuit of the present invention operates to reduce pulse distortion and transmission degradation. During operation, in response to the manual operation of key pad 26, pulse dialer integrated circuit 21 initially operates to turnon pulsing and transistor 22, thus providing a connection between T1 and R1 leads. It also disconnects lead R1 from voice and transmission circuit 40 by turning off gate circuit 25. Thus the loop is maintained through pulsing transistor 22, being disconnected from the voice and transmission circuit 40. Pulse dialer circuit 21 then operates to generate dial pulses on the Tip and Ring leads by causing the pulsing transistor 22 to turn "OFF" and "ON". When pulsing transistor 22 is turned "ON", a closed loop is maintained however when pulsing transistor 22 is turned "OFF" a true open circuit is not maintained because pulse dialer circuit 21 is also connected in shunt across the T1 and R1 leads. During this dial pulsing, this additional shunt causes dial pulse distortions since sufficient current can flow through pulse dialer 21 to prevent a true open circuit condition, thereby reducing the amplitude of the dial pulses. This dial pulse distortion (low amplitude dial pulses) causes a reduction in the usable loop length.

Current source 30 is connected in series with circuit 21 to present a high impedance across the T1 and R1 leads through pulse dialer 21. Current source 30 operates to provide this high impedance by limiting the current through it. As current flow increases, the current flow is limited ultimately causing the current flow to stabilize, regulating the current flow to pulse dialer circuit 21.

Since pulse dialer circuit 21 is connected across the T1 and R1 leads during any "OFF HOOK" condition, it also operates as a shunt during transmission thereby causing degradation. Current source 30 then operates in a similar manner to provide a high impedance during this mode of operation limiting the current shunting effect of pulse dialer 21 thereby improving the transmission characteristics.

In the "ON HOOK" mode an alternate path is provided from the Tip and Ring leads through the break hookswitch contacts of hookswitch S to the second diode bridge of polarity guard 11. The negative output of bridge 11 is connected to the negative rail of the telephone circuit (or lead R1) with the positive output extended through the second current source 31 to the pulse dialer 21. By virtue of this alternative circuitry during the "ON HOOK" condition through a second current source, current is supplied to pulse dialer 21 to maintain information stored in the memory portion thereof while still reflecting a high impedance condition to the telephone line and thus to the telephone central office.

While but a single embodiment of the present invention has been shown it will be obvious to those skilled in the art that numerous modifications may be made without departing from the spirit of the present invention which shall be limited only by the scope of the claims appended hereto.

What is claimed is:

1. A telephone circuit connected to a telephone line, comprising: pulse dialing means; first current regulating means including a first rectifying bridge and a first current regulator connected between said first rectifying bridge and said pulse dialing means; second current regulating means including a second rectifying bridge and a second current regulator connected between said second rectifying bridge and said pulse dialing means and hookswitch means normally in the "ON HOOK" position connecting said telephone line to said second current regulating means, operated to the "OFF HOOK" position to connect said telephone line to said first current regulating means, and said hookswitch means restored to said "ON HOOK" position to disconnect said first current regulating means from said telephone line and reconnect said second current regulating means to said telephone line.

2. A telephone circuit as claimed in claim 1, wherein: said pulse dialing means comprise: a pulse dialer integrated circuit including memory means for storing predetermined sequences of calling signals.

3. A telephone circuit as claimed in claim 2, wherein: said pulse dialing means further includes a key pad connected to said pulse dialer manually operated to control said pulse dialer.

4. A telephone circuit as claimed in claim 2, wherein: said pulse dialing means further includes switching means connected between said telephone line and said pulse dialer, operated in response to said dialer to pulse said telephone line.

5. A telephone circuit as claimed in claim 4, wherein: said switching means comprises a transistor.

6. A telephone circuit as claimed in claim 2, wherein: said telephone circuit further includes a voice and transmission circuit; and said pulse dialing means further include gating means connected between said pulse dialer and said voice and transmission circuit operated in response to said pulse dialer to disconnect said voice and transmission circuit from said telephone line.

7. A telephone circuit as claimed in claim 2, wherein: said pulse dialing means further include filter means connected across said pulse dialer.

8. A telephone circuit as claimed in claim 7, wherein: said filter means comprise a capacitor.

* * * * *